(12) United States Patent
Laine

(10) Patent No.: US 8,106,815 B2
(45) Date of Patent: Jan. 31, 2012

(54) SYSTEM FOR POSITIONING A TERRESTRIAL USER

(75) Inventor: Robert Laine, Paris (FR)

(73) Assignee: Astrium SAS, Paris (FR)

( * ) Notice: Subject to any disclaimer, the term of this patent is extended or adjusted under 35 U.S.C. 154(b) by 174 days.

(21) Appl. No.: 12/667,869

(22) PCT Filed: Jun. 19, 2008

(86) PCT No.: PCT/FR2008/000856
§ 371 (c)(1),
(2), (4) Date: Jan. 5, 2010

(87) PCT Pub. No.: WO2009/013404
PCT Pub. Date: Jan. 29, 2009

(65) Prior Publication Data
US 2010/0182192 A1    Jul. 22, 2010

(30) Foreign Application Priority Data

Jul. 10, 2007  (FR) ..................................... 07 04975

(51) Int. Cl.
*G01S 19/38* (2010.01)
*H04B 7/19* (2006.01)
(52) U.S. Cl. ................................... 342/357.21; 342/356
(58) Field of Classification Search ................. 342/352, 342/356, 357.2, 357.4, 357.21; 701/213
See application file for complete search history.

(56) References Cited

U.S. PATENT DOCUMENTS

| 5,982,323 A | 11/1999 | Czichy |
| 5,999,127 A * | 12/1999 | Dezelan .......................... 342/359 |
| 6,182,927 B1 * | 2/2001 | Galvin ......................... 244/158.4 |
| 2008/0211718 A1 | 12/2008 | Martin |

FOREIGN PATENT DOCUMENTS

| EP | 0 880 031 | 11/1998 |
| EP | 1 777 159 | 4/2007 |

OTHER PUBLICATIONS

International Search Report dated Apr. 15, 2009.
Written Opinion of the International Searching Authority with English Translation, Apr. 15, 2009.
F. Richter, "Galileo—die europaische Satellitennavigation," Technische Rundschau, No. 5, XP001249835, Mar. 2001, pp. 34-36.

* cited by examiner

*Primary Examiner* — Dao Phan
(74) *Attorney, Agent, or Firm* — Dickinson Wright PLLC

(57) ABSTRACT

Disclosed is a system for positioning a terrestrial user. The system includes navigation satellites placed in medium altitude orbits, management satellites placed in high orbits, able to manage the navigation satellites and communicate with the Earth. The management satellites can include a set of at least three management satellites each placed in a high orbit, having a plane that is inclined with respect to the plane of the terrestrial equator and cuts the equator along a diametral straight intersection line with respect to the Earth. Two external diametral straight intersection lines can form an angle of longitude of at least 90 degrees.

6 Claims, 4 Drawing Sheets

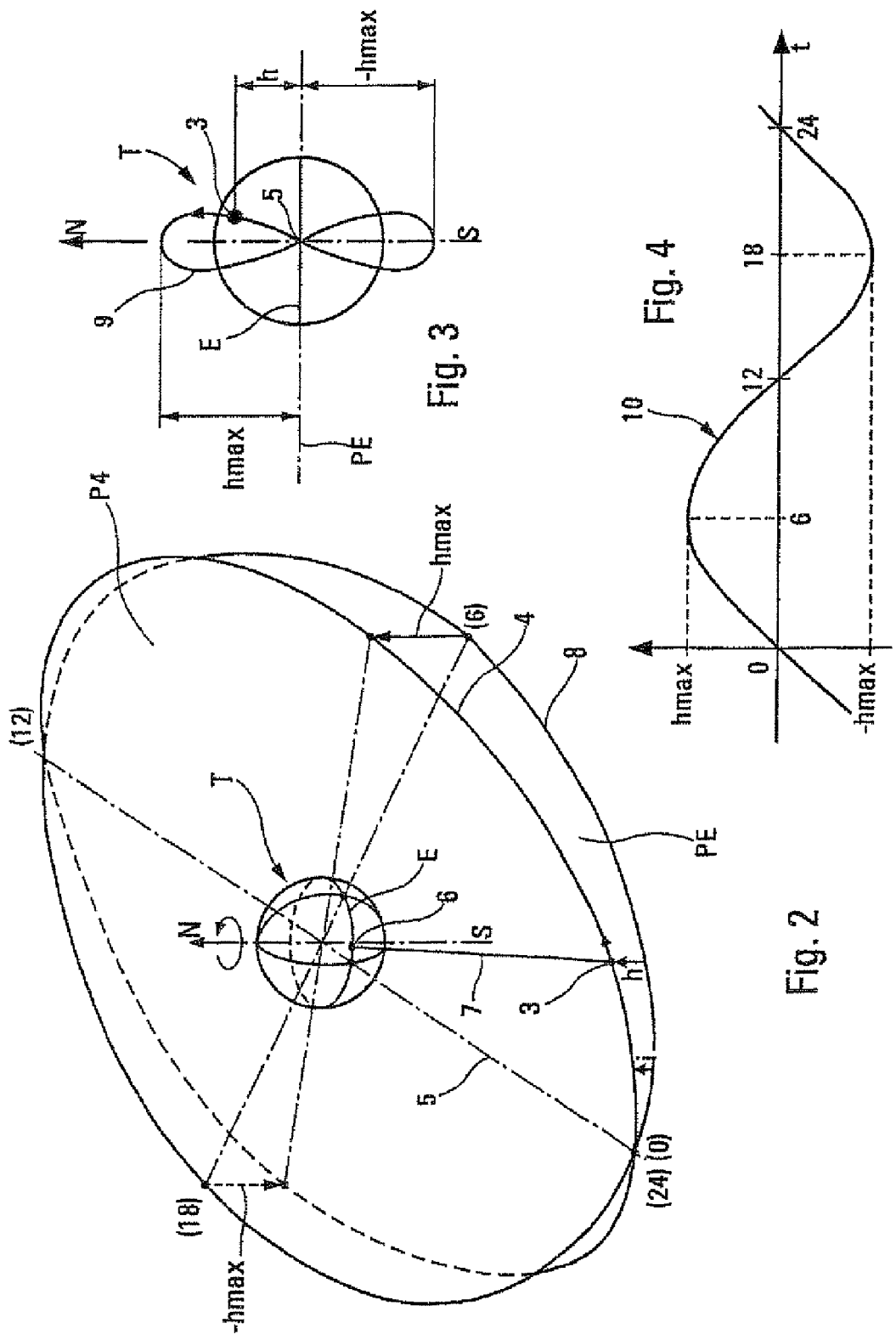

SYSTEM FOR POSITIONING A TERRESTRIAL USER

FIELD OF THE INVENTION

The present invention relates to satellite-based systems for positioning a terrestrial user, this user being situated on the Earth, on the sea or else in terrestrial orbit.

BACKGROUND OF THE INVENTION

It is known that satellite-based positioning systems comprise a constellation of navigation satellites placed in medium altitude orbits (of the order of 25 000 km) around the Earth. These navigation satellites and their orbits are generally designated in the art by "MEO satellites" and "MEO orbits", respectively (Medium Earth Orbit). The navigation satellites are distributed uniformly in several orbital planes, in such a way that, at any point of the Earth, a user can see several navigation satellites, that is to say be in direct lines with them (at least three, but four if the user wishes to know his altitude) and deduce therefrom his own terrestrial coordinates. Moreover, at least one terrestrial monitoring center, cooperating with communications stations distributed over the surface of the Earth, is provided to ensure the nominal operation of the constellation of navigation satellites.

To improve the management of said constellation of navigation satellites, it has already been proposed that said monitoring center and said terrestrial communication stations be supplemented with management satellites placed in high orbits (of the order of 45 000 km), able to at least partially manage said navigation satellites and to communicate with the Earth.

It goes without saying that the manufacture, deployment, use and operation of such management satellites in high orbits represent considerable costs, so that it is advantageous to limit the number of said management satellites.

SUMMARY OF THE INVENTION

The subject of the present invention is therefore a terrestrial positioning system making it possible to achieve this objective.

To this end, according to the invention, the system for positioning a terrestrial user, said system comprising:
- a first plurality of navigation satellites placed in medium altitude orbits; and
- a second plurality of management satellites placed in high orbits, able to at least partially manage said navigation satellites and to communicate with the Earth, is noteworthy in that:
- said second plurality comprises a set of at least three management satellites each placed in a high orbit, whose plane is inclined with respect to the plane of the terrestrial equator and cuts the latter along a diametral straight intersection line with respect to the Earth; and
- the two external diametral straight intersection lines make between themselves an angle of longitude at least equal to 90°.

Thus, matters are arranged such that there are at least two management satellites in view of each navigation satellite, while avoiding the masking of the Earth.

In order to ensure the regularity of the communications between the navigation satellites and the management satellites, it is advantageous that the plane determined by the management satellites of said set be constantly outside the set of medium altitude orbits of said first plurality.

In practice, said angle of longitude is at most equal to 160°, so that said management satellites remain in view of the same monitoring station.

Preferably, the inclinations of the planes of the high orbits of the three management satellites of said set are identical.

To reduce the number of ground communications stations, it is advantageous that the inclined high orbits of the management satellites of said set be geosynchronous.

As a function of time, the apparent heights of the three management satellites, viewed from the Earth's equator, vary sinusoidally. It is then advantageous that the corresponding sinusoids be shifted by a number of hours equal to 24/n, n being the number of management satellites of said set.

BRIEF DESCRIPTION OF THE DRAWINGS

The figures of the appended drawing will elucidate the manner in which the invention may be embodied. In these figures, identical references designate similar elements.

FIG. 2 shows, in a schematic perspective view, a management satellite disposed in a geosynchronous high orbit.

FIG. 3 illustrates the trajectory of the management satellite of FIG. 2, viewed from the Earth's equator.

FIG. 4 is a chart illustrating, as a function of time t (in hours), the apparent height, above the equator, of the management satellite of FIGS. 2 and 3.

DETAILED DESCRIPTION OF THE INVENTION

Figure 1:
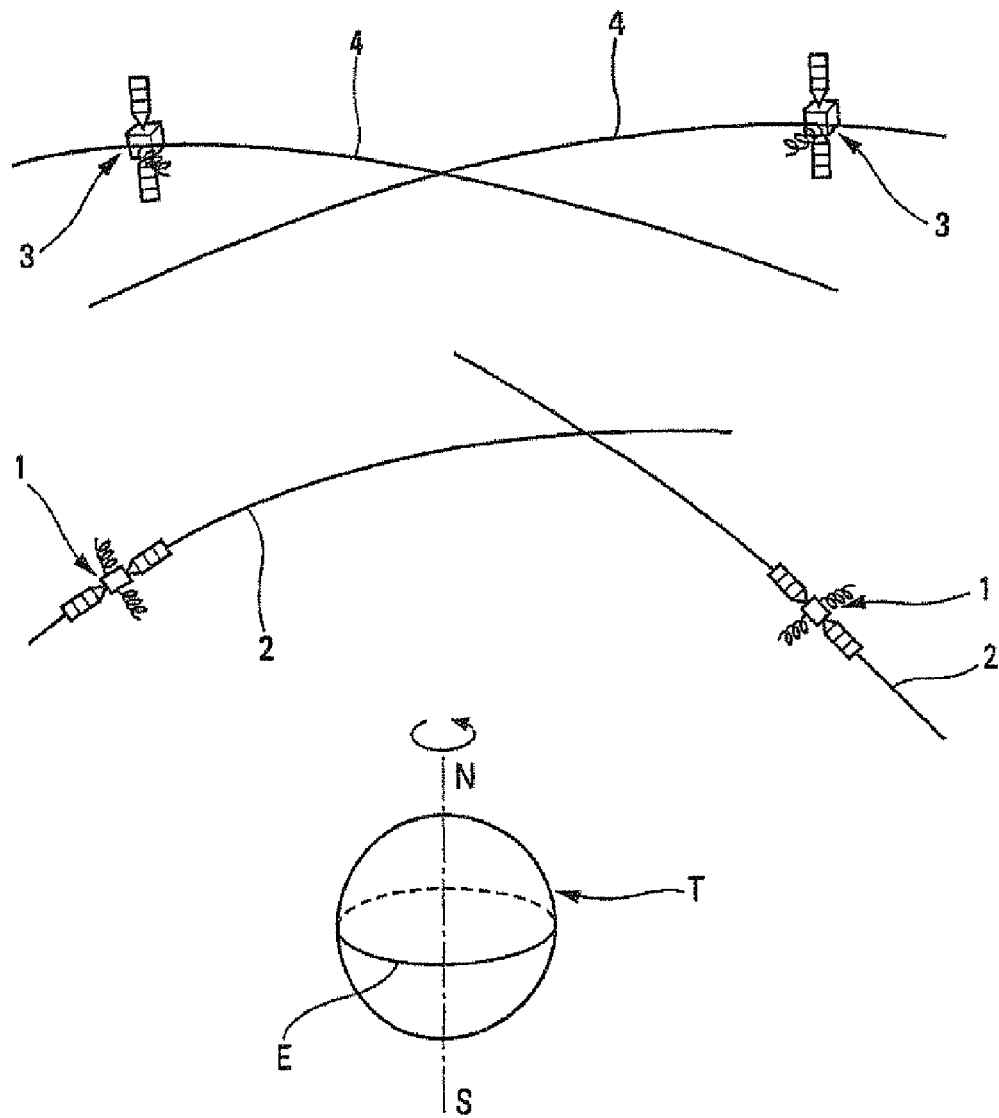
FIG. 1 is a schematic and partial view of a satellite-based positioning system comprising management satellites in high orbits.

The known satellite-based positioning system, represented schematically and partially in FIG. 1, comprises:
- navigation satellites 1 placed in medium altitude orbits 2 (of the order of 25 000 km) around the Earth T; and
- management satellites 3 placed in high orbits 4 (of the order of 45 000 km) around the Earth T.

By way of a monitoring center and terrestrial communications stations (not represented), said management satellites 3 are able to manage at least partially the navigation satellites 2, for example, but not exclusively, in the manner described in French patent application No. 07 03562 filed on 18 May 2007 in the name of the same Applicant.

FIGS. 2, 3 and 4, intended to clearly elucidate the present invention described subsequently in regard to FIGS. 5, 6 and 7, pertain to a single management satellite 3 placed in a high orbit 4. In this case (see FIG. 2), this high orbit 4 is geosynchronous and its plane P4 is inclined by an angle of inclination i with respect to the plane PE of the equator E. The intersection of the planes P4 and PE is a diametral straight line 5. Represented moreover in FIG. 2 are:
- the point 6 of the equator E lying in the terrestrial meridian plane passing through said management satellite 3 and the line of sight 7 joining said point 6 to it; and
- the geostationary orbit 8, disposed in the plane PE of the equator E, of period twenty-four hours and of radius equal to 42 000 km, this geostationary orbit corresponding to the orthogonal projection of the high orbit 4 onto the plane PE.

Because the high orbit 4 is geosynchronous, the line of sight 7 remains pointed at the management satellite 3, as the latter follows said high orbit 4 and as the equatorial point 6 rotates with the Earth about the latter's North (N)-South (S) axis.

Thus, for an observer placed on the equator E and able to observe the management satellite 3, the apparent height h of said management satellite 3 varies in a sinusoidal manner in the course of the rotation of the earth T and of said satellite 3, because the plane P4 of the geosynchronous high orbit 4 is inclined with respect to the plane PE of the equator E. The sinusoid representative of the variation of the apparent height h as a function of time t (in hours) has been represented in FIG. 4.

If it is assumed, as in FIG. 4, that the management satellite 3 is aligned with the diametral straight line 5 at 0 hours, this apparent height h is zero at 0 hours and at 12 hours, a maximum (value hmax) at 6 hours and a minimum (value −hmax) at 18 hours (see FIG. 4).

It follows from this that, for an observer placed on the equator E, the management satellite 3 describes an apparent trajectory 9, in a figure of eight with North-South axis, disposed in a plane tangential to said geosynchronous high orbit 4 and comprising two symmetric lobes whose crossing point is situated on the diametral straight intersection line 5 (see FIG. 3). For this observer, it can therefore be considered that in twenty-four hours the management satellite 3 describes the apparent trajectory 9 about the diametral straight intersection line 5.

Figure 5:
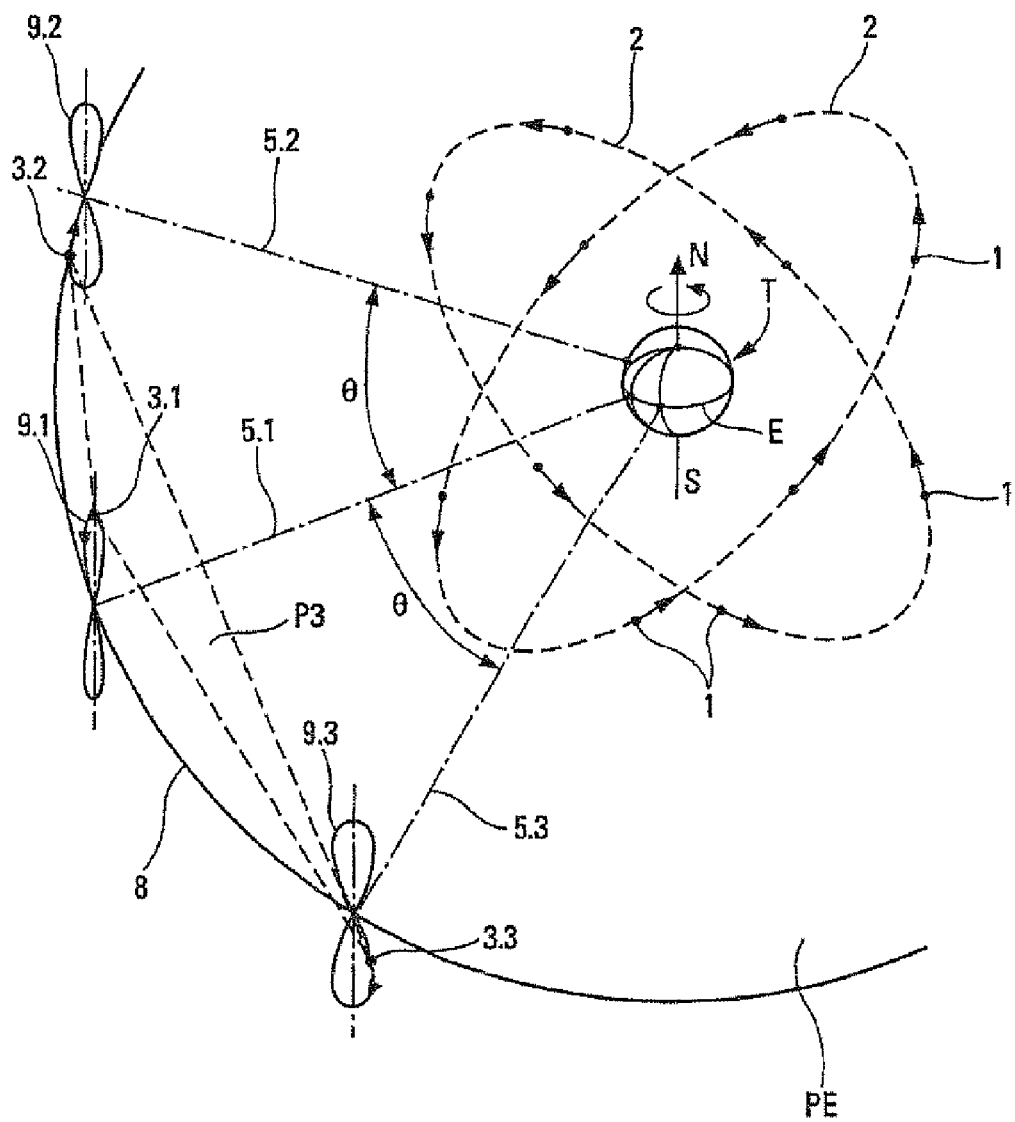
FIG. 5 illustrates, in a schematic and partial perspective view, the positioning system with three management satellites, in accordance with the present invention.

The system for positioning a terrestrial user, in accordance with the present invention and represented in FIG. 5, comprises, in addition to a plurality of navigation satellites 1 placed in medium altitude orbits 2, three management satellites 3.1, 3.2 and 3.3 (similar to the satellite 3) each placed in a high orbit. These three high orbits are not represented for the sake of the clarity of the drawing, but they are each similar to the high orbit 4 described with regard to FIG. 2.

Just like the high orbit 4 of FIG. 2, the three geosynchronous high orbits (respectively similar to the orbit 4) on which the management satellites 3.1, 3.2 and 3.3 are respectively placed lie in planes (respectively similar to the plane P4) inclined with respect to the plane PE of the equator E and cut said plane PE along diametral straight intersection lines 5.1, 5.2 and 5.3 (each similar to the diametral straight intersection line 5), respectively. The inclinations i, with respect to said plane PE, of the planes containing the high orbits of said management satellites 3.1, 3.2 and 3.3 are equal and the two diametral straight intersection lines 5.2 and 5.3, which lie on either side of the intermediate diametral straight intersection line 5.1, make with the latter an angle of longitude 8 at least equal to 45° and at most equal to 80°.

Moreover, the plane P3 determined by the three management satellites 3.1, 3.2 and 3.3 is outside the set of medium altitude orbits 2 in which the navigation satellites 1 are placed.

Thus, in a manner similar to what was explained above in regard to the satellite 3, each satellite 3.1, 3.2 and 3.3 describes, for an observer placed on the equator E and observing it, an apparent trajectory 9.1, 9.2 or 9.3 in a figure of eight, with North-South axis and disposed in a plane tangential to the geostationary orbit 8, the two lobes of each apparent trajectory 9.1, 9.2 and 9.3 crossing on the diametral straight intersection line 5.1, 5.2 or 5.3, respectively. This is illustrated by the diagram of FIG. 6, in which the three apparent trajectories 9.1, 9.2 and 9.3 have been represented face on.

The apparent heights h of said management satellites 3.1, 3.2 and 3.3 therefore vary in a sinusoidal manner as a function of time t. The corresponding three sinusoids 10.1, 10.2, 10.3 (each of them being similar to the sinusoid 10 of FIG. 4) have been represented in FIG. 7.

Figure 6:
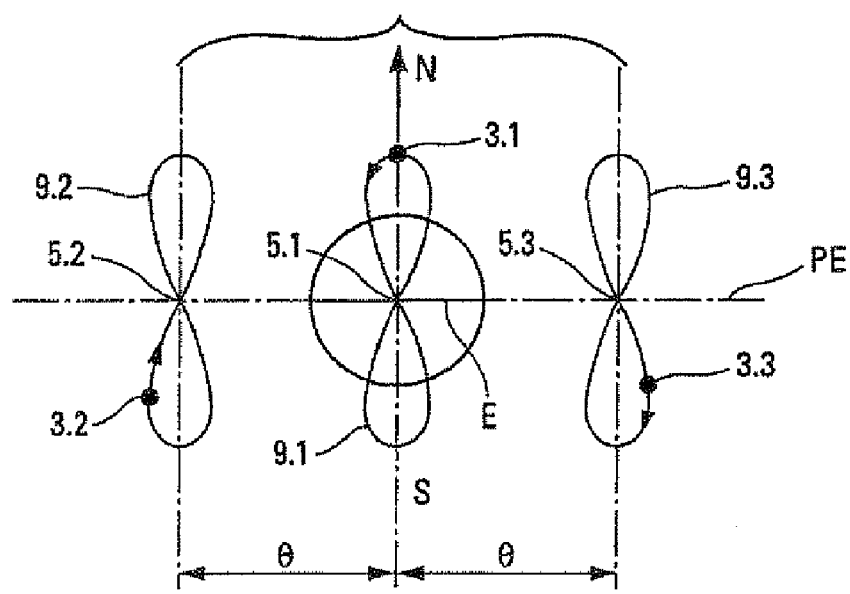
FIG. 6 shows, in a schematic view, the set of apparent trajectories of the three management satellites of the system of FIG. 5.
Figure 7:
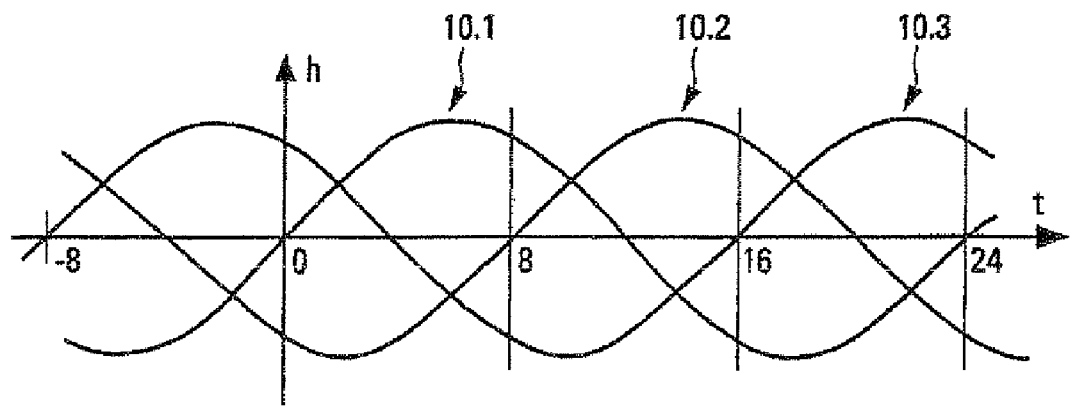
FIG. 7 is a chart illustrating, as a function of time t (in hours), the intertwining of the sinusoidal variations of the apparent heights of the three management satellites of the system of FIG. 5.

In the example of FIGS. 6 and 7, the management satellite 3.2 has a phase lag of eight hours with respect to the management satellite 3.1 and a phase lead of eight hours with respect to the satellite 3.3.

The invention claimed is:

1. A system for positioning a terrestrial user, said system comprising: a first plurality of navigation satellites placed in medium altitude orbits; and a second plurality of management satellites placed in high orbits, able to at least partially manage said navigation satellites and to communicate with the Earth, wherein:

said second plurality comprises a set of at least three management satellites each placed in a high orbit, whose plane is inclined with respect to the plane of the terrestrial equator and cuts the latter along a diametral straight intersection line with respect to the Earth; and the two external diametral straight intersection lines make between themselves an angle of longitude at least equal to 90°.

2. The system as claimed in claim 1, wherein the plane determined by the management satellites of said set is constantly outside the set of medium altitude orbits of said first plurality.

3. The system as claimed in claim 1, wherein said angle of longitude is at most equal to 160°.

4. The system as claimed in claim 1, wherein the inclinations of the planes of the high orbits of the management satellites of said set are identical.

5. The system as claimed in claim 1, wherein the high orbits of the management satellites of said set are geosynchronous.

6. The system as claimed in claim 1, wherein the sinusoidal apparent heights of said three management satellites, viewed from the Earth, are out of phase by a number of hours equal to 24/n, n being the number of management satellites of said set.

* * * * *